(12) United States Patent
Heckert et al.

(10) Patent No.: US 10,035,155 B2
(45) Date of Patent: Jul. 31, 2018

(54) DISPENSER FOR TWO-COMPONENT SPRAY POLYURETHANE FORM THAT ARE FREE OF GASEOUS BLOWING AGENTS

(71) Applicant: Dow Global Technologies LLC, Midland, MI (US)

(72) Inventors: Michael F. Heckert, Lake Orion, MI (US); Peter J. Schulz, Midland, MI (US); Daniel R. Schroer, Saginaw, MI (US); Matthew J. Turpin, Sanford, MI (US); Gregory T. Stewart, Midland, MI (US); Jie Cai, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/327,283

(22) PCT Filed: Sep. 15, 2014

(86) PCT No.: PCT/CN2014/086506
§ 371 (c)(1),
(2) Date: Jan. 18, 2017

(87) PCT Pub. No.: WO2016/041117
PCT Pub. Date: Mar. 24, 2016

(65) Prior Publication Data
US 2017/0157628 A1 Jun. 8, 2017

(51) Int. Cl.
*B05B 7/04* (2006.01)
*B29B 7/74* (2006.01)
(Continued)

(52) U.S. Cl.
CPC .............. *B05B 7/0416* (2013.01); *B05B 7/02* (2013.01); *B05B 15/025* (2013.01); *B05B 15/55* (2018.02); *B29B 7/7438* (2013.01)

(58) Field of Classification Search
CPC ....... B05B 7/04; B05B 7/0408; B05B 7/0416; B05B 7/045; B05B 7/02; B05B 15/025;
(Continued)

(56) References Cited

U.S. PATENT DOCUMENTS

| 4,262,847 A | 4/1981 | Stitzer et al. |
| 4,263,166 A * | 4/1981 | Adams ................. B05B 7/1209 |
| | | 261/78.2 |

(Continued)

FOREIGN PATENT DOCUMENTS

| CN | 101698162 | 4/2010 |
| SU | 1407839 | 7/1988 |

OTHER PUBLICATIONS

Search report from corresponding European 14902249.3 application, dated Mar. 28, 2018.
(Continued)

*Primary Examiner* — Steven J Ganey
*Assistant Examiner* — Juan C Barrera
(74) *Attorney, Agent, or Firm* — Steven W. Mork

(57) ABSTRACT

A dispenser comprises a housing defining at least three feed channels, a spool valve with a spool defining at least three flow passages, a deformable sealing plug in at least two of the feed channels and in sealing orientation with both the housing and the spool, and a nipple in at least the two feed channels of the housing comprising sealing plugs; wherein the spool can reversibly rotate between an open orientation and a closed orientation can dispense two-component form formulations that are free of gaseous blowing agents.

10 Claims, 4 Drawing Sheets

(51) Int. Cl.
 *B05B 15/02* (2006.01)
 *B05B 7/02* (2006.01)
 *B05B 15/55* (2018.01)

(58) Field of Classification Search
 CPC ..... B05B 15/55; B05B 7/1209; B05B 7/0025; B05B 7/2497; B05B 1/3026; B05B 12/002; Y10T 137/86823; Y10T 137/86863; Y10T 137/86879; B29B 7/7438; B29B 7/7447; B29B 7/7457; B29B 7/7605; B29B 7/761
 USPC ....... 239/414, 390, 400, 428, 432, 528, 487, 239/416.1, 415; 222/145.1, 144.5, 145.7; 137/625.48
 See application file for complete search history.

(56) References Cited

U.S. PATENT DOCUMENTS

| | | | | |
|---|---|---|---|---|
| 4,925,107 | A | * | 5/1990 | Brown ................. B05B 12/002 239/414 |
| 5,529,245 | A | * | 6/1996 | Brown ................. B05B 7/1209 222/145.7 |
| 5,586,724 | A | | 12/1996 | Allen |
| 5,704,548 | A | | 1/1998 | Hedger et al. |
| 5,944,259 | A | | 8/1999 | Brown |
| 6,431,468 | B1 | * | 8/2002 | Brown ................. B05B 7/1209 222/145.5 |
| 6,894,083 | B2 | | 5/2005 | Braun et al. |
| 6,991,185 | B2 | | 1/2006 | Brown |
| 7,744,019 | B2 | * | 6/2010 | Merchant ............. B01F 5/0615 239/411 |
| 8,544,689 | B2 | * | 10/2013 | Bertram ................ B29B 7/7438 222/145.6 |
| 2003/0116647 | A1 | * | 6/2003 | Brown ................. B29B 7/7447 239/414 |
| 2006/0208000 | A1 | | 9/2006 | Murray et al. |
| 2014/0054399 | A1 | | 2/2014 | Hsieh |

OTHER PUBLICATIONS

Search report from corresponding Japanese 2017-530374 application, dated Feb. 26, 2018.

* cited by examiner

DISPENSER FOR TWO-COMPONENT SPRAY POLYURETHANE FORM THAT ARE FREE OF GASEOUS BLOWING AGENTS

BACKGROUND OF THE INVENTION

Field of the Invention

The present invention relates to a dispenser suitable for dispensing a two-component spray polyurethane foam systems that are free of gaseous blowing agents.

Introduction

Dispensing devices for fluid components are in wide use for application of mixed fluids, especially in the area of polyurethane systems such as polyurethane foam systems. Two component polyurethane (2C-SPU) foam formulations are typically applied by simultaneously feeding an isocyanate component (A Component) with a polyol component (B Component) to create a mixture and then spraying the mixture from a dispenser.

2C-SPU foam systems are generally classified into two classes: those that contain a gaseous blowing agent (GBA) in one or both of the A and B Component and those that are free of GBA in either A or B Component ("GBA-Free 2C-SPU foam systems"). GBAs are blowing agents that have a vapor pressure greater than 0.23 Mega Pascals (MPa) at 25 degrees Celsius (° C.). Typical GBAs include 1,1,2, 2-tetrafluoroethane (HFC-134a), carbon dioxide, nitrogen, and 1,3,3,3-tetrafluoropropene (1234ze). GBAs are beneficial in a 2C-SPU not only as frothing aids but to lower the viscosity of the component they are in. Lower viscosity components are easier to dispense because they require less pressure to flow through flow channels of a dispenser.

GBA-Free 2C-SPU foam systems generally require a pressurized gas as a third feed concomitant with the A and B components when dispensing the 2C-SPU foam system. GBA-Free 2C-SPU foam systems can be high pressure systems or low pressure systems. In high pressure systems, which are systems that require dispensing pressures greater than 4 Mega Pascals (MPa), the pressurized gas helps shape the spray and can be used to clean the dispensing nozzle used to dispense the 2C-SPU. In low pressure systems, which are systems that can be dispensed at pressures lower than 4 MPa, typically lower than 2 MPa, the pressurized gas is useful as a motive and mixing force for the A and B components. The requirement of a pressurized gas means that a dispenser requires at least three simultaneous feeds as opposed to two feed for 2C-SPU foam systems containing GBA. Additionally, the lack of GBA means that the A and B components are typically higher viscosity than in 2C-SPU foam systems containing GBA, which means the dispenser requires higher pressures, larger feed channels or both.

There are a number of dispensing devices suitable for 2C-SPU foam systems comprising GBAs. For example, particularly useful dispensing devices are disclosed in U.S. Pat. No. 4,925,107, U.S. Pat. No. 5,529,245 and U.S. Pat. No. 6,991,185. Each of these dispensing devices benefit from use of a spool valve that comprises a spool that conveniently can be repeatedly rotated between a closed-configuration and an open configuration by either squeezing or releasing a trigger. The spool has a pair of flow passage extending through it. In the open-configuration these flow passages in the spool align with flow passages in component feed channels of the dispenser so as to allow A and B Components to flow through the spool and ultimately out of the dispenser. In the closed-configuration the flow passages rotate out from alignment with the feed channels of the dispenser thereby precluding A and B Component to flow.

Such a dispenser is designed for 2C-SPU foam systems that contain GBA, systems that require two feeds and have relatively low viscosity fluids. However, dispensers well suited for 2C-SPU foam systems containing GBAs are not necessarily well suited for use with 2C-SPU foam systems that are free of GBAs due at least in part to a need to dispense higher viscosity A and B Components as well as simultaneously dispense a pressurized gas with the A and B Components.

Dispensers taught in the references cited above are unsuitable for use with GBA-Free 2C-SPU foam systems. GBA-Free 2C-SPU foam systems require at least three dispensing fluids that simultaneously combine as they are dispensed. The dispensers described above allow for only two fluid feeds. Adding a third fluid feed to a spool valve type dispenser in a manner that does not leak—which is a critical requirement for reactive systems like 2C-SPU foam systems—is non-trivial. Similarly, engineering a suitable dispenser that can operate with higher viscosity A and B Components is non-trivial because it requires operating at higher pressures, larger diameter feed lines, or both and any one of these requirements creates challenges for designing a valve system on the dispenser that functions in an convenient manner without leaking and that is inexpensive to manufacture.

There is a need for a dispensing device suitable for use with GBA-Free 2C-SPU foam systems. In particular, there is a need for a convenient and inexpensive dispensing device that can accommodate the A and B Component viscosities of a GBA-Free 2C-SPU foam system along with a third gas feed and that provides impingement of the three feeds as it dispenses while avoiding leaking and premature mixing of A and B components in the dispenser. Moreover, it is desirable to use a convenient and inexpensive spool valve type actuator in such a dispensing device to make assembly and operation simple and cost low.

BRIEF SUMMARY OF THE INVENTION

The present invention offers a solution to the problem of providing a dispensing device suitable for use with GBA-Free 2C-SPU foam systems. In particular, the present invention provides a solution to the need for a convenient and inexpensive dispensing device that can accommodate the A and B Component viscosities of a GBA-Free 2C-SPU foam system along with a third gas feed and that provides dispensing of the three feeds while avoiding leaking and unintended mixing of A and B components in the dispenser. Even more, the present invention provides such a solution that uses an inexpensive and convenient spool valve type actuator in the dispenser.

The present invention is a result of discovering that significant design modifications are necessary to known spool-type dispensers useful for 2C-SPU foam systems that contain GBA in order to make them compatible with GBA-Free 2C-SPU foam systems. For example, the need for at least three fluid feeds required at least three holes in the spool. Higher viscosity fluids benefit from larger holes through the dispenser spool. As a result of needing more holes and desirably having larger holes, a larger diameter spool was needed, but that created greater challenges at preventing leaking between the fluid feeds. Sealing feed channels to prevent A and B Components from prematurely mixing, particularly around the spool, required designing conformable sealing plugs that fit into feed channels and generally fit to the contour of the spool to seal the feed channel against the spool. Moreover, the sealing plugs needed to seal against the feed channel itself to prevent fluid being fed through the channel from seeping around the sealing plug. Each of these features was discovered while seeking to solve problems realized while trying to modify a spool-type mixer dispenser for 2C-SPU foam systems containing GBAs for use with GBA-Free 2C-SPU foam systems.

In a first aspect, the present invention is a dispenser comprising: (a) a housing with a feed end and an opposing dispensing end, the feed end having defined therein at least three feed channels and the dispensing end having defined therein at least one dispensing channel; (ba spool valve mounted in the housing between the feed end and dispensing end, the spool valve comprising a spool with at least three separate flow passages defined through the spool each flow passage having a feed end opening and a dispensing end opening and at least four gasket grooves defined circumferentially around the spool in which a gasket resides so that each gasket presses against the spool and housing to form a seal around the circumference of the spool with a gasket groove defined on each side of the three flow passage openings and a gasket in each of the four gasket grooves; (c) a deformable sealing plug in at least two feed channels positioned so as to be in a sealing orientation with the housing about the feed channel so as to prevent fluid communication through the feed channel around the sealing plug, the sealing plug having opposing spool and feed ends and a flow channel extending through the sealing plug and through the opposing ends, wherein the spool end of the sealing plug is pressing against and is in sealing contact with the spool, the entire sealing plug being elastomeric and deformable; (d) a nipple in each of at least the two feed channels of the housing containing sealing plugs and extending inside and out from the feed end of the feed channels, the nipples having opposing entrance and exit ends and a flow channel extending through each nipple, including through the exit and entrance ends, the nipples oriented such that the exit end of a nipple presses against the feed end of a sealing plug within the feed channel of the housing and such that the flow channels of sealing plug and nipple are in fluid communication, the nipples being free of screw threading that screws the nipple into the feed channel; wherein the spool can reversibly rotate between: (i) an open position where each of three passages through the spool aligns in fluid communication with a feed channel and the dispending channel of the housing with at least two of the passages in the spool achieving fluid communication with a flow channel of the housing through a flow channel of a sealing plug and nipple; and (ii) a closed position where the passages through the spool are not in fluid communication with a flow channel of the housing.

In a second aspect, the present invention is a method of using the dispenser of the first aspect, the method comprising: (a) simultaneously supplying under pressure: (i) a liquid isocyanate component into a first feed channel of the housing through the flow channels of a nipple and plug residing in the first feed channel; (ii) a liquid polyol component into a second feed channel of the housing through the flow channels of a nipple and plug residing in the second feed channel; and (iii) a gas into a third feed channel of the housing; (b) position the spool of the dispenser to allow the liquid isocyanate component, the polyol component and the gas to flow through separate passages through the spool; and (c) dispensing a combination of the isocyanate component, polyol component and gas out from the dispensing channel of the housing. Preferably (i), (ii) and (iii) are all free of gaseous blowing agents.

The present invention is useful for dispensing GBA-Free 2C-SPU foam systems.

DETAILED DESCRIPTION OF THE INVENTION

Figure 1:
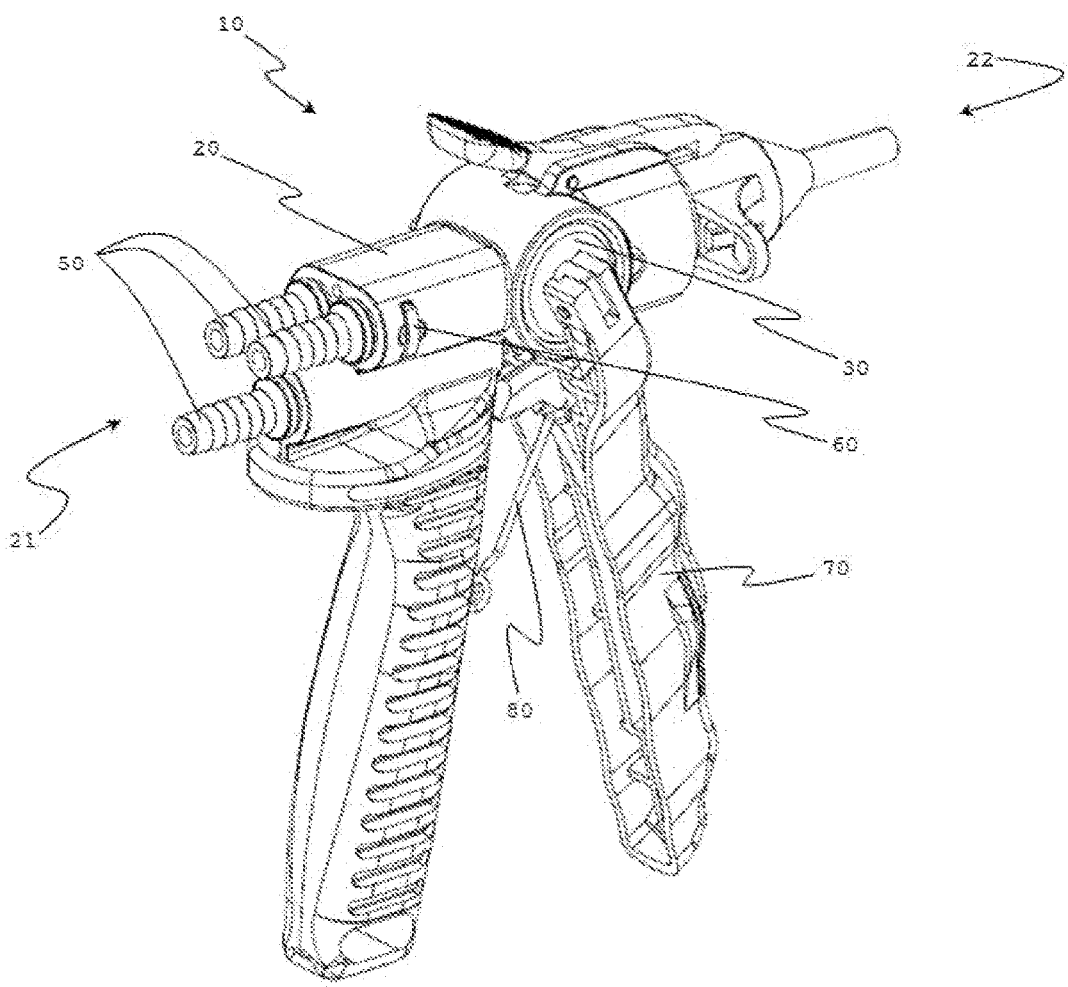
FIG. 1 illustrates a dispenser of the present invention.

"And/or" means "and, or as an alternative". All ranges include endpoints unless otherwise indicated. "Multiple" means two or more.

The mixing device of the present invention comprises a housing with a feed end and an opposing dispensing end. The feed end of the housing has defined therein at least three feed channels. The dispensing end has at least one dispensing channel in fluid communication with the feed channels.

The feed channels and dispensing channel(s) are enclosed by the housing with openings providing access into and out from the channels through the housing.

Desirably, the feed channels are free of threading that allows an element to screw into the feed channel. Threading in a feed channel is part of the housing defining the feed channel. A threaded element can screw into a feed channel that has threading by interlocking with the threads of the housing within the feed channel and rotating to be drawn into (or out from) the feed channel. Desirably, the feed channel is also free of components that have defined therein threads which an element can screw into. Components in the feed channel are desirably frictionally fit or pressure fit into the feed channel, which means that friction between the component and housing around the feed channel hold the element in place.

The present dispenser accommodates flexibility in orienting the feed channels with respect to one another. For example, the feed channels can all be in a line (coplanar) with respect to one another. Alternatively, two of the feed channels can be in a line with a third feed channel out of line with the other two (non-coplanar with the other two) such as in a triangular orientation.

The housing further defines at least one dispensing channel in fluid communication with the feed channels. When dispensing 2C-SPU foam formulation, the A and B Component and the gas component flow through independent feed channels and are combined within the housing prior to being dispensed from the housing through one or more than one dispensing channel. Notably, the housing can be a single piece or comprise multiple pieces that fit together. For example, the dispensing channel or channels may be defined in a piece that is removably attached to another piece defining the feed channels.

The dispenser comprises a spool valve in the housing between the feed channels and the dispensing channel(s). The spool valve comprises a spool that rotates between an open orientation and a closed orientation. Desirably, the spool is of a general cylindrical shape with an essentially circular cross section on an axis that traverses the feed and dispensing channels and about which the spool rotates. The spool has at least three passages defined there through, each passage having a feed end opening in the spool and a dispensing end opening in the spool. Each of the passages is desirably entirely enclosed within the spool except for the feed end opening and the dispensing end opening of the passages.

The spool has defined circumferentially around the spool at least four gasket grooves positioned such that there is a gasket groove on each side of each flow passage through the spool. A gasket, such as an o-ring, resides in each gasket groove such that the gasket presses against the spool and housing thereby preventing fluid communication between flow passages around the spool.

The spool desirably has a bleed groove defined circumferentially around the spool between two gasket grooves and in fluid communication with one of the flow passages through the spool, one of the feed channels and the dispensing channel of the dispenser. Desirably, pressurized gas is fed through a feed channel to the flow passage in fluid communication with the bleed groove and the bleed groove allows some pressurized gas to flow around the spool and to the dispensing channel even when the spool is in a closed orientation. By allowing some gas to continue to flow even when the spool is in a closed configuration allows the gas to blow out from the dispenser reactive A and B Components that otherwise could react together and plug the dispensing channel if allowed to set for a period of time without otherwise cleaning.

The dispenser comprises deformable sealing plugs in at least two feed channels through which the A and B Components are fed. Each sealing plug is in sealing orientation with the feed channel it is in, which means that there is no fluid communication through the feed channel around the sealing plug. To facilitate achieving a sealing orientation in the feed channel, the sealing plug desirably have a lip molded into it that runs circumferentially around the sealing plug and that presses against the housing within the feed channel in which the sealing plug resides.

The sealing plugs each have opposing spool and feed ends and a flow channel extending through the sealing plug and through the opposing spool and feed ends to create a spool end opening and a feed end opening into the sealing plug flow channel. The flow channel is in fluid communication with outside of the housing through the feed end opening and feed channel. The spool end of the sealing plug presses against the spool. The spool end of the sealing plug is in sealing contact with the spool, and aligns with a passage through the spool when the spool is in an open orientation and is sealed against the spool without access to a passage in the spool when in a closed orientation. Sealing contact means that fluid flowing through the sealing plug is prohibited from flowing between the sealing plug and the spool but rather either flows from the sealing plug flow channel into a passage of the spool or is prohibited from flowing through the sealing plug flow channel by the spool.

The entire sealing plug is elastomeric and conformable. The sealing plug conforms to the housing feed channel in which it resides in order to seal against the housing to prevent fluid flow around the sealing plug within the housing feed channel. The spool end of the sealing plug conforms to the spool as the sealing plug is pressed against the spool so as to form a seal against the spool thereby preventing fluid flow from the flow channel through the sealing plug to the outside of the spool as opposed to into a flow passage of a spool. Desirably, the entire plug is elastomeric and conformable for ease and convenience of manufacture. In fact, it is desirable that the entire seal plug is a made of a single homogeneous composition rather than made of multiple elements of different compositions for ease of manufacture, low cost, and structural integrity of the seal plug. Being made of a single homogeneous material prevents distinct components such as O-rings or gaskets from becoming displaced from the sealing plug, which can result in leaks.

Desirably, the sealing plug is a unitary structure made from a single homogeneous composition that is an elastomeric polymer. For example, the sealing plug can be made of natural rubber, polyurethane, polybutadiene, neoprene, silicone or preferably an elastomeric rubber made of ethylene propylene diene monomer (EPDM) rubber and polypropylene (for example, the elastomer available under the trade name SANTOPRENE™, SANTOPRENE is a trademark of Exxon Mobil Corporation).

The spool end of the sealing plug desirably has a contoured shape that generally matches the contour of the spool against which the spool end is pressed. For instance, the spool is desirably generally cylindrical in shape with a generally circular cross section so the spool end of the plug desirably has a curved profile to generally match the curve of the outside of the cylindrical spool. By "generally" match it is understood that the contour of the spool end of the sealing plug does not have to be identical to the profile of the outside of the spool against which it presses, though it can be an identical match. The sealing plug is conformable so slight deviations from an identical matching profile can be accommodated while still achieving a sealing configuration with the spool if the profile of the spool end of the sealing plug is not identical to the outside profile of the spool. If the sealing plug is sufficiently conformable, the spool end can be of essentially any shape and still form a sealing configuration with the spool. However, to avoid potential difficulties with rotating the spool between open and closed orientations in the dispenser and to facilitate achieving a sealing configuration with the spool, it is desirable for the spool end of the sealing plug to have a shape generally matching the profile of the outside of the spool.

The sealing plug can include alignment features that facilitate positioning of the sealing plug in a particular orientation with respect to a reference such as the housing or spool. Such alignment features are particularly valuable when the spool end of the sealing plug is contoured to fit the spool because the alignment features allows orientation of the sealing plug so that the sealing plug properly fits to the spool. Alignment features include any characteristic that is part of the sealing plug and that indicates orientation within a feed channel of the housing. For example, the sealing plug can have one or more than one protrusion that extends partially into the flow channel of the sealing plug. Then, the sealing plug can be inserted into the feed channel of the housing in a consistent orientation with respect to the housing for each sealing plug by positioning the protrusion in the same orientation with respect to the housing. For example, a sealing plug can have one or more than one protrusion within the flow channel of the sealing plug that is positioned in a certain direction when the profile of the spool end of the sealing plug is aligned so as to mate with the orientation of the spool. The alignment feature can also, or alternatively, be on the outside of the sealing plug and fit into a groove or other feature within the feed channel. For example, the sealing plug can have a protrusion, or preferably opposing protrusions, on the surface of the sealing plug that contacts the housing when inserted into the feed channel of the housing and the housing can have corresponding grooves into which the protrusions fit and seal against the housing. Incorporating threading increases cost and complication of manufacture and assembly, which the present invention can avoid.

The sealing plug is desirably free of threading enabling it to screw into a feed channel of the housing, but rather frictionally fits into a feed channel and seals against the housing within the feed channel by pressing against the housing.

The dispenser further comprises a nipple extending inside and out from the feed end of at least the two feed channels of the housing that contain sealing plugs. The nipples have opposing entrance and exit ends and a flow channel extending through each nipple through the entrance end and through the exit end. In at least two of the feed channels of the housing there is both a sealing plug and a nipple oriented such that the exit end of the nipple presses against, preferable directly against, the feed end of the sealing plug and the flow channel of the nipple is in fluid communication with the flow channel of the sealing plug. The sealing plug presses against the spool with its spool end against a nipple with its feed end and, as such, is held in place within the channel by the spool and nipple in addition to the friction between the housing inside the feed channel and the sealing plug. Desirably, the sealing plug forms a seal against the exit end of the nipple so that fluid traveling through the flow channel of the nipple into the flow channel of the sealing plug does not leak out between the nipple and sealing plug where the nipple and sealing plug press against one another.

The nipples are free of threading for screwing into a feed channel of the housing. Instead, the nipples frictionally fit into a feed channel of the housing with the nipple pressing against the housing within the feed channel. The nipple desirably forms a seal with the housing within the feed channel of the housing. The nipple extends out from the feed end of the feed channel of the housing to enable connecting each nipple to a feed line. Any type of connection is possible on the end of the nipple. One convenient form of the nipple has barbs circumferentially around the nipple that extends outside the housing feed channel so the entrance end of the nipple can be positioned into tubing and the barbs frictionally hold the tubing about the nipple. The nipple can alternatively comprise any type of connector such as compressing fitting attachments, pipe thread attachments and the like on the entrance end of the nipple.

The dispenser can further comprise fasteners that extend from outside the housing into the housing proximate to the feed channel and nipple within the feed channel in such a way as to either extend around or into the nipple to further hold the nipple in place in the feed channel. Suitable fasteners include metal staples, metal clips and plastic clips.

The spool of the dispenser is positioned in the housing so that it can reversibly rotate between an open position and a closed position. In the open position, the spool is oriented such that the feed end of each of three passages through the spool aligns in fluid communication with a flow channel of the housing with at least two of the passages achieving fluid communication with a flow channel of the housing through a flow channel of a sealing plug and nipple. Similarly, three passages through the spool are in fluid communication with the dispensing channel of the housing when the spool is in the open position. Hence, when the spool is in an open position, fluid flow is achievable through the nipples and sealing plugs of two feed channels through the spool and through the dispensing channel of the dispenser and fluid flow is simultaneously achievable through a third feed channel (optionally, via a flow channel of a nipple, sealing plug, or both) and through a passage in the spool and through the dispensing channel of the dispenser. While it is required that fluid flow is achievable through three passages of the spool and through three feed channels of the housing into the dispensing channel of the housing when the spool is in an open orientation, there can be more than three feed channels in the housing each of which are in fluid communication with a passage through the spool, optionally through a flow channel of a nipple and/or sealing plug and optionally with the dispensing channel of the housing or some other channel of the housing. Alternatively, the spool can only align three passages with three feed channels to achieve fluid communication through the three feed channels and three passages into the dispensing channel of the housing.

In the closed position, the spool is oriented without a passage through the spool being aligned in fluid communication with the flow channels of the sealing plugs in at least two of the feed channels, and preferably such that no passage through the spool is aligned in fluid communication with a feed channel of the housing. In the closed position, the spool end of the flow channel through the sealing plugs is sealed against the spool rather than sealed round a feed end opening of a passage through the spool thereby preventing fluid flow from the spool end of the sealing plug. Desirably, each of the feed channels of the housing are sealed against the spool to as to prevent fluid flow through the feed channel when the spool is in a closed position.

The dispenser can also include a mixing component after the spool valve wherein fluid flow from two or more, preferably at least three of the feed channels are combined and fed into the dispensing channel of the housing. The mixing component can comprise a static mixing element to facilitate mixing of the fluids from the different feed channels.

The passages through the spool can follow similar or different directions with respect to one another through the spool. For instance, the spool can define three passages through the spool that all travel in a straight line in plane with a diameter of a cross section of the spool. Such an alignment of spool passages is useful when there are three coplanar feed channels in a line and the spool passages are desired to have dispensing ends aligned linearly in a plane. When the feed channels are not aligned linearly in a coplanar fashion then at least one of the passages through the spool follows a different orientation from the other passages. In one desirable configuration, the feed channels are nonplanar yet the dispensing openings of the passages through the spool are aligned linearly in a coplanar fashion. In such a configuration, two of the spool passages can extend along a diameter of a spool cross section and a third spool passage follows a curved path that extends from above or below the feed end of the other two passages and curves within the spool to align the dispensing end linearly in a coplanar orientation with respect to the dispensing ends of the other two spool passages. Such a configuration is desirable to achieve a smaller housing size about the feed channel than might otherwise be achievable if the three feed channels were aligned linearly in a coplanar fashion.

The dispenser can comprise a handle, preferably affixed to or molded as a unitary portion of the housing of the dispenser. A handle facilitates holding and aiming of the dispenser.

The dispenser can comprise a trigger attached to the spool so that when the trigger is moved in a first direction the spool rotates to an open orientation and when the trigger is moved in an opposite direct relative to the first direction the spool rotates to a closed orientation. The trigger can be as simple as a lever attached to one or both ends of the spool so that moving the lever rotates the spool. Desirably, the dispenser comprises both a handle and a trigger with the trigger connected to the spool and extending in a similar or same plane as the handle so as to allow holding of the dispenser via the handle and opening and closing of the spool by squeezing or releasing the trigger. The dispenser can further comprise a spring that holds the trigger in a position that keeps the spool in a closed orientation unless the trigger is moved and then replaces the trigger in a position that places the spool in a closed orientation when released.

The dispenser of the present invention is useful for dispensing three or more fluids in a controlled manner. A particularly valuable use for the dispenser is for dispensing 2C-SPU foam formulation using a pressurized gas. For example, one method of using the dispenser of the present invention comprises: (a) simultaneously supplying under pressure (i) a liquid isocyanate component ("A component") into a first feed channel of the housing through the flow channels of a nipple and plug residing in the first feed channel; (ii) a liquid polyol component ("B Component") into a second feed channel of the housing through the flow channels of a nipple and plug residing in the second feed channel; and (iii) a gas into a third feed channel of the housing, preferably where (i), (ii) and (iii) are free of gaseous blowing agents; (b) position the spool of the dispenser to allow the A Component, B Component and gas to flow through separate passages through the spool; and (c) dispensing a combination of the A Component, B Component and gas out from the dispensing channel of the housing. The design of the present dispenser is such that the feed channels for the A Component and B Component remain sealed even under pressures necessary for GBA-Free 2C-SPU foam system applications.

FIGS. 1-5 and the description below further illustrate embodiments and/or aspects of embodiments of a dispenser of the present invention.

FIG. 1 illustrates dispenser 10 comprising housing 20 with feed end 21 and dispensing end 22, spool 30, sealing plugs 40 (not visible), nipples 50, fastener 60, trigger 70 and spring 80. Further perspectives and aspects of dispenser 10 are illustrated in FIGS. 2-5.

Figure 2:
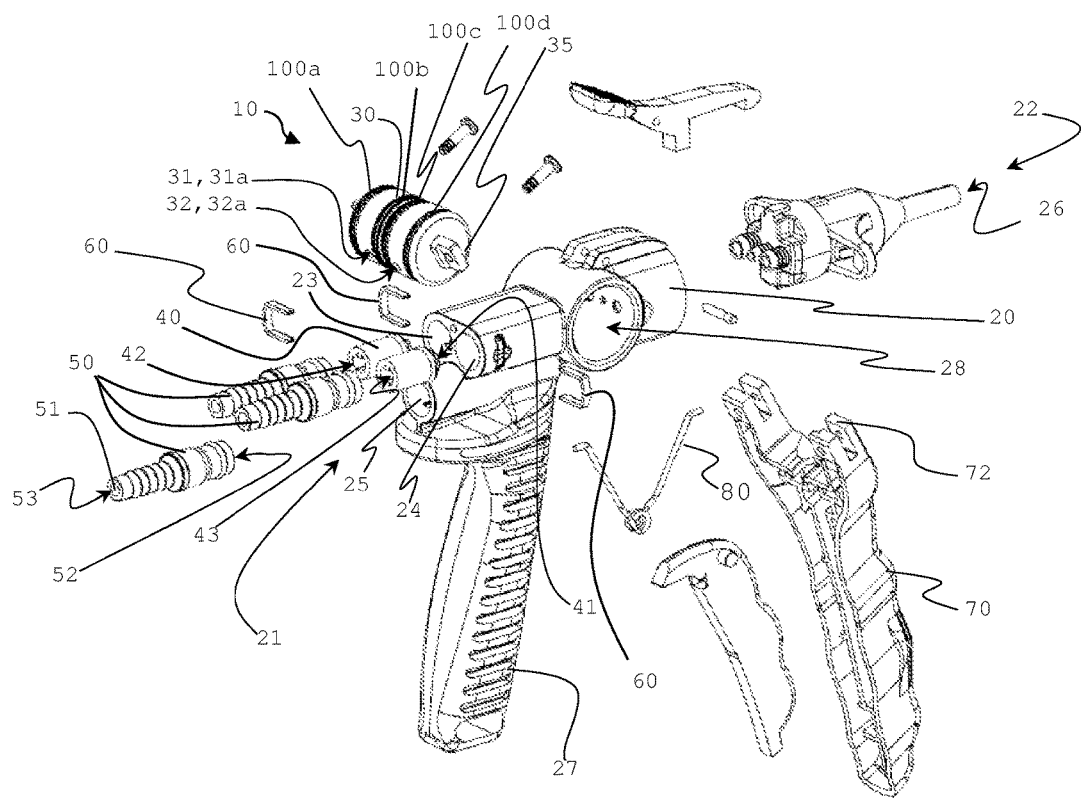
FIG. 2 illustrates and exploded view of the dispenser of FIG. 1.

FIG. 2 illustrates an exploded view of dispenser 10 revealing elements of the dispenser. Housing 20 shows a feed end 21, dispensing end 22, feed channels 23, 24 and 25 and dispensing channel 26. Housing 20 further comprises handle 27 and spool receiver 28. Spool 30 fits into spool receiver 28 to form the spool valve of dispenser 10. Spool 30 has flow passage 31, 32 and 33 (33 is not visible) which respectively have feed ends 31a, 32a and 33a (33a is not visible). Dispensing ends 31b, 32b and 33b of spool flow passages 31, 32 and 33 are not visible. Spool 30 comprises tabs 35 with which spool 30 can be rotated from an open orientation to a closed orientation in housing 20. Spool 30 further has defined circumferentially around it four gasket grooves 38a, 38b, 38c, and 38d (none of which are visible in FIG. 2) in which O-rings 100a, 100b, 100c, and 100d respectively reside. Dispenser 10 has two deformable Sealing plugs 40 that fit into feed channels 24 and 25. Sealing plugs 40 each have a spool end 41, feed end 42 and a flow channel 43 extending through each sealing plug 40. Spool end 41 of each sealing plug 40 presses against spool 30 of the dispenser. There is a nipple 50 that inserts into each of feed channels 23, 24 and 25. Each nipple 50 has an entrance end 51 and an exit end 52 and a flow channel 53. Exit end 52 presses against feed end 42 of the deformable sealing plugs 40 in feed channels 23 and 24. Fasteners 60 extend through housing 20 to hold nipples 50 in place within feed channels 23, 24 and 25. Dispenser 10 comprises trigger 70 with attachment means 72 that attach to tabs 35 of spool 30. Displacing trigger 70 towards or away from handle 27 rotates spool 30 either into an open orientation or a closed orientation in housing 20. Spring 80 serves to restore trigger 70 into a position away from handle 27, which positions spool 30 into a closed orientation. Squeezing trigger 70 towards handle 27 rotates spool 30 into an open orientation. Releasing trigger 70 allows spring 80 to move trigger 70 away from handle 27 and rotate spool 30 into a closed orientation.

Figure 3:
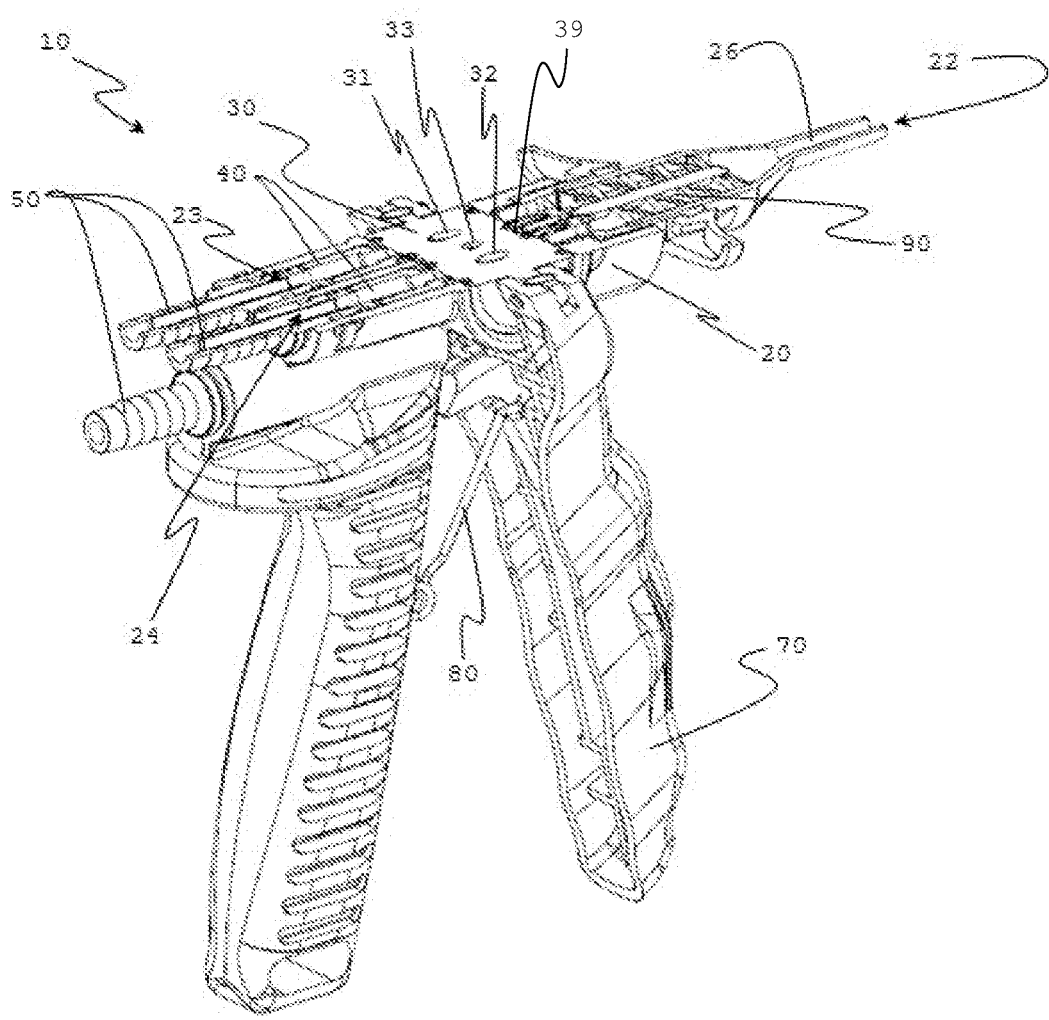
FIG. 3 illustrates a cut-away view of the dispenser of FIG. 1.

FIG. 3 illustrates a cut-away view of dispenser 10 with the top of the dispenser cut away to show the orientation of nipples 50, sealing plugs 40 and spool 30 in feed channels 23 and 24. Dispenser 10 has trigger 70 and spool 30 in a closed orientation and flow passages 31, 32 and 33 are all visible in spool 30. Also illustrated in this cut-away view is static mixer 90 that resides in fluid communication with and between feed channels 23, 24 and 25 (feed channel 25 not shown in FIG. 3) and dispensing channel 26 and serves to mix A and B components and pressurized gas together before being dispensed through feed end 22 of dispenser 10. Bleed grove 39 is also visible in spool 30.

Figure 4A:
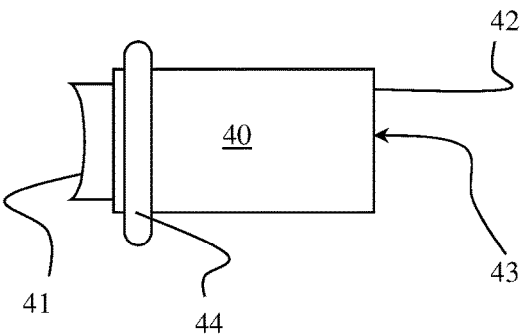
FIGS. 4a and 4b illustrate larger images of the sealing plug of the dispenser in FIG. 1.
Figure 4B:
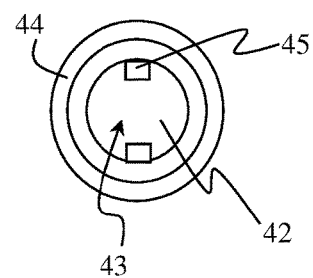

FIGS. 4a and 4b illustrate larger images of sealing plug 40 including a side view in FIG. 4a and an end view in FIG. 4b as viewed from feed end 42. Sealing plug 40 comprises a contoured profile on spool end 41 that conforms to the cylindrical body of spool 30. Sealing plug 40 also comprises lip 44 that extends circumferentially around sealing plug 40. Sealing plug 40 further comprises alignment features 45 that are protrusions extending into flow channel 43. Alignment features 45 identify the sides of sealing plug 40 corresponding to the furthest extending portion of spool end 41 and thereby allow alignment of the sealing the contour of spool end 41 from feed end 42.

Figure 5A:
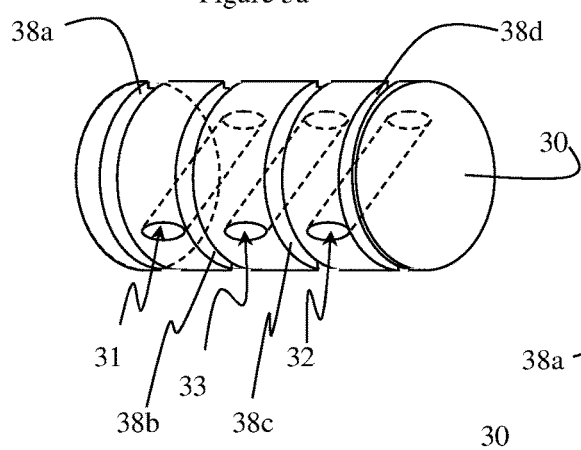
FIGS. 5a, 5b and 5c illustrate different spools that can be used with dispensers of the present invention.
Figure 5B:
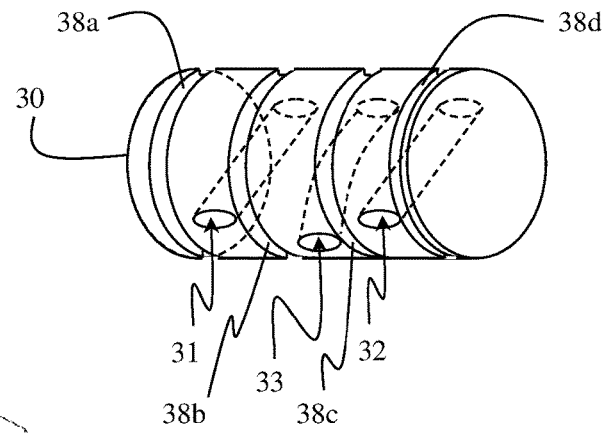
Figure 5C:
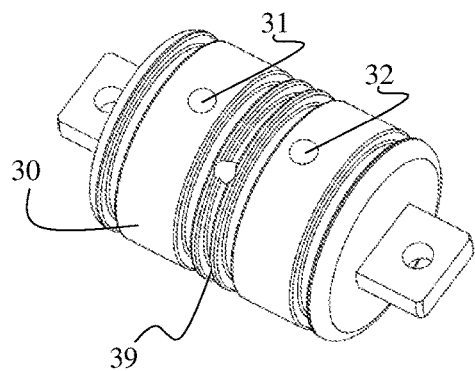

FIGS. 5a, 5b and 5c illustrate different spools 30 showing two different ways to orient flow passage 31, 32 and 33 depending on the orientation of feed channels 23, 24 and 25. FIG. 5a shows the three flow passages oriented linearly in a coplanar fashion and each extending radially through a diameter of spool 30. Also evident are gasket grooves 38a, 38b, 38c and 38d. That extend circumferentially around spool 30 and are positioned to have a gasket groove on each side of the flow passages 31, 32 and 33. FIG. 5b shows an alternative orientation of flow passage 31, 32 and 33 where only two are in linear coplanar orientation and the third is non-planar with the other two FIG. 5c illustrates bleed groove 39 in spool 30.

What is claimed is:

1. A dispenser comprising:
    (a) a housing with a feed end and an opposing dispensing end, the feed end having defined therein at least three feed channels and the dispensing end having defined therein at least one dispensing channel;
    (b) a spool valve mounted in the housing between the feed end and dispensing end, the spool valve comprising a spool with at least three separate flow passages defined through the spool each flow passage having a feed end opening and a dispensing end opening and at least four gasket grooves defined circumferentially around the spool with a gasket residing in each gasket groove so that each gasket residing in a gasket groove presses against the spool and housing to form a seal around the circumference of the spool with a gasket groove defined on each side of the three flow passage openings and a gasket in each of the four gasket grooves;

(c) a deformable sealing plug in at least two feed channels positioned so as to be in a sealing orientation with the housing about the feed channel so as to prevent fluid communication through the feed channel around the sealing plug, the sealing plug having opposing spool and feed ends and a flow channel extending through the sealing plug and through the opposing ends, wherein the spool end of the sealing plug is pressing against and is in sealing contact with the spool, the entire sealing plug being elastomeric and deformable;

(d) a nipple in each of at least the two feed channels of the housing containing the deformable sealing plugs and extending inside and out from the feed end of the feed channels, the nipples having opposing entrance and exit ends and a flow channel extending through each nipple, including through the exit and entrance ends, the nipples oriented such that the exit end of a nipple presses directly against the feed end of a sealing plug within the feed channel of the housing and such that the flow channels of sealing plug and nipple are in fluid communication, the nipples being free of screw threading that screws the nipple into the feed channel;

wherein the spool can reversibly rotate between: (i) an open position where each of three passages through the spool aligns in fluid communication with a feed channel and the dispending channel of the housing with at least two of the passages in the spool achieving fluid communication with a flow channel of the housing through a flow channel of a sealing plug and nipple; and (ii) a closed position where the passages through the spool are not in fluid communication with flow channels of the sealing plugs in at least two of the feed channels; and wherein each of the three passages through the spool is entirely enclosed within the spool except for feed and opening and the dispensing end opening of the passages.

2. The dispenser of claim 1, wherein the spool end of the sealing plugs have a profile that generally matches that of the spool profile and each sealing plug is aligned in a feed channel so that the profile of the spool end of the sealing plug is aligned and conforms to the profile of the spool.

3. The dispenser of claim 2, further characterized by the sealing plug having alignment features that facilitate positioning of the sealing plug in a particular orientation with respect to the housing.

4. The dispenser of claim 1, further characterized by the deformable sealing plug being made of elastomeric polymer.

5. The dispenser of claim 1, wherein the sealing plugs frictionally fit into the feed channels of the housing and wherein the sealing plugs are free of threading for screwing into the feed channels of the housing.

6. The dispenser of claim 1, wherein the feed channels of the housing that contain the deformable the sealing plugs are each free of threading for screwing an element into the feed channel.

7. The dispenser of claim 1, further characterized by two of the feed channels being coplanar and the third feed channel being non-coplanar with the other two and wherein the spool is cylindrical with two of the flow passage extending radially through the spool and capable of aligning with the two coplanar feed channels and the third flow passage entering in a non-coplanar orientation with the other feed channels but exiting the spool aligned in a linear orientation with respect to the other passages such that when the spool is oriented in an open orientation the entrances to the flow passages each align with a different one of the feed channels and fluids flowing through the feed channels proceed through the passages of the spool so as to exit the spool passages aligned along a plane.

8. The dispenser of claim 1, further comprising a trigger attached to the spool so that when the trigger is moved in a first direction the spool rotates to an open orientation and aligns the flow passages of the spool into fluid communication with the feed channels of the housing and when the trigger is moved in a direction opposite to the first direction, the spool rotates into a closed orientation so that the flow passages of the spool are not in fluid communication with the feed channels of the housing.

9. The dispenser of claim 1, further characterized by having a bleed groove defined circumferentially around the spool between two gasket grooves containing gaskets, the bleed groove being in fluid communication with one of the flow passages through the spool.

10. A method of using the dispenser of claim 1, the method comprising: (a) simultaneously supplying under pressure: (i) a liquid isocyanate component into a first feed channel of the housing through the flow channels of the nipple and plug residing in the first feed channel; (ii) a liquid polyol component into a second feed channel of the housing through the flow channels of the nipple and plug residing in the second feed channel; and (iii) a gas into a third feed channel of the housing; (b) position the spool of the dispenser to allow the liquid isocyanate component, the polyol component and the gas to flow through separate passages through the spool; and (c) dispensing a combination of the isocyanate component, polyol component and gas out from the dispensing channel of the housing.

\* \* \* \* \*